United States Patent [19]

Mustafa

[11] Patent Number: 5,337,489
[45] Date of Patent: Aug. 16, 1994

[54] INSTRUMENT

[76] Inventor: Mahir M. Mustafa, 316 Reigate Road, Bromley, Kent, United Kingdom, BR1 5JN

[21] Appl. No.: 34,203

[22] Filed: Mar. 10, 1993

Related U.S. Application Data

[63] Continuation of Ser. No. 891,057, Jun. 1, 1992, abandoned.

[30] Foreign Application Priority Data

Jun. 5, 1991 [GB] United Kingdom ............... 9112037

[51] Int. Cl.[5] ............................................. G01B 5/00
[52] U.S. Cl. ..................................... 33/832; 33/833; 33/534
[58] Field of Search ............... 33/832, 833, 834, 556, 33/558.01, 558.4, DIG. 1, 571, 534

[56] References Cited

U.S. PATENT DOCUMENTS

| | | | |
|---|---|---|---|
| 2,627,118 | 2/1953 | Young | 33/832 |
| 2,830,374 | 4/1958 | Aivaz | 33/534 |
| 3,597,848 | 8/1971 | Matson | 33/833 |
| 3,939,569 | 2/1976 | Squires | 33/832 |
| 4,545,124 | 10/1985 | Brooks | 33/833 |
| 4,637,142 | 1/1987 | Baker | 33/833 |
| 4,761,892 | 8/1988 | Jankkila | 33/833 |
| 4,945,651 | 8/1990 | Georg | 33/DIG. 1 |
| 5,131,166 | 7/1992 | Weber | 33/832 |

FOREIGN PATENT DOCUMENTS

| | | | |
|---|---|---|---|
| 0039582 | 11/1981 | European Pat. Off. | |
| 626967 | 3/1936 | Fed. Rep. of Germany | 33/833 |
| 17903 | 1/1986 | Japan | 33/833 |
| 203464 | 6/1939 | Switzerland | 33/833 |
| 1173159 | 8/1985 | U.S.S.R. | 33/833 |
| 243545 | 12/1925 | United Kingdom | |
| 552840 | 4/1943 | United Kingdom | |
| 912368 | 12/1962 | United Kingdom | |
| 1393927 | 5/1975 | United Kingdom | |

*Primary Examiner*—Christopher W. Fulton
*Attorney, Agent, or Firm*—Shapiro and Shapiro

[57] ABSTRACT

An instrument or gauge for measuring a parameter of a surface feature of a member such as a weld at the junction of two members of an oil rig. The instrument comprises a body adapted to be secured to the surface of a member during measurement, and a probe assembly carried by the body for angular and linear displacement with respect to the body and having relatively movable probe assembly parts and, and a datum for determining relative movement of those parts and, and an arrangement adapted to allow linear movement of the probe assembly relative to the body at a particular angular displacement of the probe assembly relative to the body. The instrument is portable, hand held and hand manipulable, and at one end of the body there is a pivotably mounted carrier in the form of a substantially cylindrical boss having a hole therethrough in which the probe assembly is slidably mounted and by which the probe assembly is carried for angular displacement with respect to the body. The arrangement adapted to allow linear movement of the body comprises a manually operable locking device, knob or nut which clamps the carrier in the body after a pivoting or angular motion or displacement with respect to the body.

5 Claims, 1 Drawing Sheet

INSTRUMENT

This is a continuation of application Ser. No. 891,057 filed Jun. 1, 1992, now abandoned.

The invention relates to an instrument, particularly an instrument for measuring a parameter of a surface feature of a member, for example an instrument used by inspection divers for accurately measuring the depth of remedial grinding either present or carried out in underwater structural welds of structures such as oil rigs.

The structural integrity of offshore oil installations is of paramount importance to both oil and gas companies and offshore workers alike. Thus in the British sector of the North Sea oil fields, complex and rigorous safety standards are enforced by the Health and Safety Executive and the Department of Energy of the United Kingdom. An element of these safety standards is the compulsory annual inspection of all subsea structural components of offshore installations for corrosion, deformation, subsidence and structural integrity. In particular, all structural welds must be inspected for cracks and other imperfections, and where necessary remedial action must be carried out. Safety standards require that all such work must be carefully recorded by physical measurement and video equipment. The difficult working conditions make this measurement a time-consuming and expensive task.

As part of the aforesaid inspection of offshore oil installations, platforms made of steel are annually inspected to determine whether cracks have occurred within the structural attachment welds. Qualified inspection divers are used to examine relevant underwater welds. The divers clean the weld of all fouling and paint up to 75 mm either side of the weld to obtain a bare metal finish. The weld is visually inspected by the diver to look for visible cracks. Thereafter the diver uses a magnetic particle inspection (MPI) technique to check for cracks which are not visible to the naked eye.

Depending on the depth of the crack and the criticality of the affected weld, further examination of the crack may be carried out using more specialised inspection techniques (such as by ultrasonic testing) to determine the depth, length, and angle of the crack.

Sometimes crack indications detected by these techniques are suspect and further investigation is required or occasionally cracks are found of sufficient severity that remedial action has to be taken to prevent these cracks from propagating around the weld, which could result in structural failure. In both cases remedial underwater grinding is carried out to grind out the crack to a predetermined depth. This technique allows a qualified structural engineer to:

i) determine the validity of the crack indication
ii) remove the crack by excavation if it is sufficiently shallow
iii) determine the depth of the crack
iv) profile the area of excavation so that stress raising sharp edges are removed The grinding process is carried out using a mechanically driven burr grinder (or "peanut grinder"). The diver attempts to follow the line and angle of the crack. The result is a groove of varying depth, radius and angle in relation to the structural components.

When such remedial grinding is carried out, the structural integrity of the weld may be seriously jeopardised. It is therefore inoperative that the grinding process be carefully monitored and controlled by the structural engineer. The structural engineer must therefore be supplied with accurate measurements of the length and angle of crack and depth of grind by the inspection dive at each stage of the grinding process. Frequently several dives may be required to complete inspection and repair of a particular weld, often separated by several days and performed by different inspection divers. Ensuring accuracy and repeatability of measurements is vital but very difficult.

Known gauges for measuring the depth and angle of the grind are designed for surface work and are inadequate for underwater work. Occasionally instruments such as plastic rulers are used to try to determine the depth of the weld.

Both instruments are inaccurate and create frustration and aggravation for the diver. The known gauge was designed for measuring weld preparations and is inappropriate for measuring the depth and angle of redial grinding. Frequently, because of its geometry, it is impossible to gain a measurement of any kind and rough and ready improvisations must be made using any materials that fall to hand.

The result is that information supplied to the structural engineer is often inaccurate. Measurements are almost entirely inconsistent, two divers frequently providing measurements of the same grind or crack differing by up to 150% in depth, the angle usually not being determined. Not only is this frustrating for both structural engineer and diver, but it also causes unnecessary extra cost in duplication of work, excessive underwater times and ultimately comprised structural safety, as well as putting the divers' life at risk as it is not good practice to become disturbed in such a hostile environment as underneath the North Sea.

It is accordingly an object of the invention to seek to mitigate these disadvantages.

According to the invention there is provided an instrument for measuring a parameter of a surface feature of a member, comprising a body adapted to be secured to the surface of a member during measurement, and a probe assembly carried by the body for angular and linear displacement with respect thereto and having relatively movable probe assembly parts and a datum for determining relative movement of those parts, and means adapted to allow linear movement of the probe assembly relative to the body at a particular angular displacement of the probe assembly relative to the body.

There may be a carrier for the probe assembly by which it is carried for angular displacement with respect to the body. This provides for ease of adjustment.

The means may comprise a locking device for securing the carrier and the probe assembly at a particular angular displacement. This provides for independent angular and linear measurement.

The means may further comprise a second locking device for securing the probe assembly after a desired linear displacement of the probe assembly. This again provides for simplicity of construction.

There may be two probe assembly parts mounted for slidable movement with respect to one another. This provides for an efficient mounting of the two parts.

There may be inner and outer telescopically slidable parts the outer of which may carry the datum and the inner of which may carry a graduated scale which may be read in conjunction with the datum. A telescopic arrangement provides for positive relative movement.

The datum may be at an end of the outer part remote from a nose of the probe assembly. This provides for ease of reading of linear measurement.

The carrier may comprise a pointer means and the body an angular scale arranged so that the pointer and scale indicate angular displacement of the probe assembly.

The body may be adapted to be secured to the surface by a magnetic arrangement which accommodates any configuration of the surface. This provides for mounting on a variety of configuration of surface.

An instrument ending the invention is hereinafter disclosed, by way of example with reference to the accompanying drawings.

Figure 1:
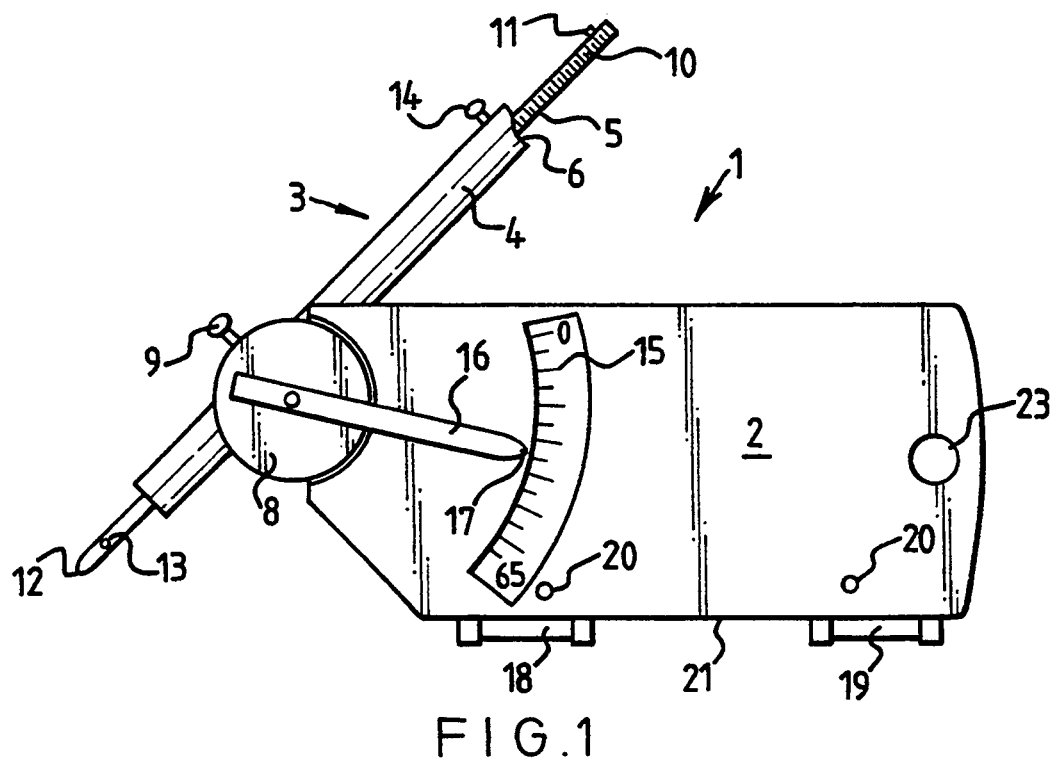
FIG. 1 is a schematic side elevational view of an instrument according to the invention, with a probe thereof at an angular position.
Figure 2:
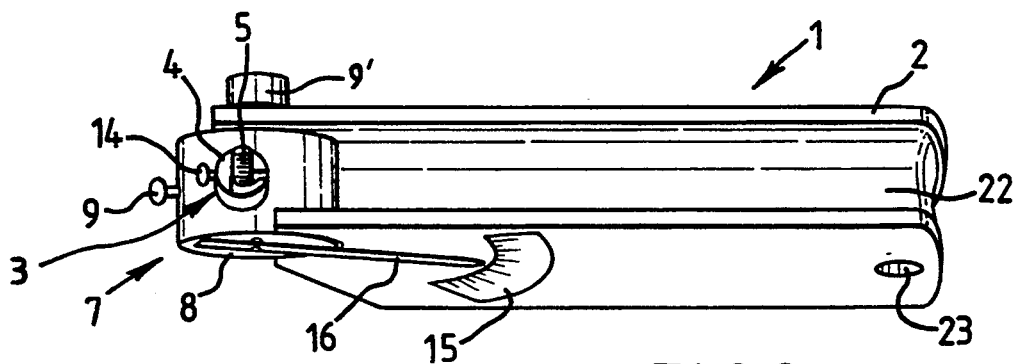
Fig.2 is a top view of the instrument of Fig.1 partly in perspective and showing the probe in an upright position.
Figure 3:
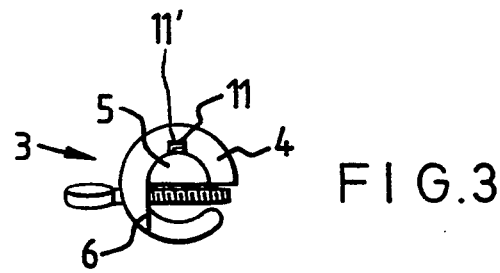
FIG. 3 is an end elevational view of a probe assembly of the instrument of Figs.1 and 2.

Referring to the drawings, there is shown an instrument 1 or gauge for measuring a parameter of a surface feature of a member such as a weld at the junction of two members of an oil rig. The instrument 1 comprises a body 2 adapted to be secured to the surface of a member during measurement, and a probe assembly 3 carried by the body 2 for angular and linear displacement with respect to the body 2 and having relatively movable probe assembly parts 4 and 5, and a datum 6 for determining relative movement of those parts 4 and 5, and means 7 adapted to allow linear movement of the probe assembly 3 relative to the body 2 at a particular angular displacement of the probe assembly 3 relative to the body 2.

The instrument 1 is portable, hand held and hand manipulable, and at one end of the body there is a pivotably mounted carrier 8 in the form of a substantially cylindrical boss having a hole therethrough in which the probe assembly 3 is slidably mounted and by which the probe assembly is carried for angular displacement with respect to the body 2. The means 7 adapted to allow linear movement of the probe assembly comprises a manually operable locking device, knob or nut which clamps the carrier 8 in the body 2 after a pivoting or angular motion or displacement with respect to the body.

In addition the means 7 comprises a second manually operable locking device, knob or nut 9, which is for securing, or clamps the probe assembly 3 in the carrier 8. The probe assembly 3 itself comprises two probe assembly parts 4 and 5 which are telescopically arranged, the outer one 4 of which parts carries at an upper (as viewed in Fig.1 and as considered in use) end the datum 6. This datum 6 is essentially a shoulder formed by cutting away a short length of the end of the part 4 down to the longitudinal axis, to expose the inner part 5, which carries at the upper (again as viewed in Fig.1 and as considered in use ) end a scale 10 in mm on a flat formed by cutting away a semi-cylindrical part of the end of the inner part 5.

A grub screw 11 which is received in a socket 11' in the outer part 4, limits downward movement of the inner part 5. The inner part 5 passes right through the outer part 4 and terminates in a probe nose or point 12.

A grub screw 13 or stop limits upward movement of the inner part 5.

A manually operable locking device, knob or nut 14 secures the inner and outer parts 4 and 5, together so that they may form a solid unit or probe assembly.

The body 2 carries a graduated angular measurement scale 15 from 0° to 65° and the carrier 8 a pointer 16 the nose 17 of which sweeps over the scale 15 as the carrier 8 rotates.

The instrument 1 is adapted to be secured to a surface of a mentor by a magnetic arrangement which can accommodate any configuration of the surface. This arrangement comprises two magnets 18, 19 individually pivoted in pivots 20 in the body 2 at a base 21 thereof. The magnets 18, 19 allow the instrument 1 to be clamped firmly to a datum surface (either curved or flat) of a structural member adjacent a crack, weld or grind so that all angular and linear measurements are in relation to a fixed reference, namely the base 21.

The probe assembly 3, and carrier 8 and locking devices 9, 9', 14 are made of anodised aluminium and the body 2 comprises amyl acetate plastic and neoprene rubber. The body 2 has grooves 22 in a surface opposite the base 21 whereby to receive the probe assembly 3, when the probe assembly is pivoted clockwise from the position shown in Fig.1. The body 2 has a hole 23 for receiving a lanyard so that the instrument can be attached to a diver or structural element.

The locking devices 9, 9', 14 and grub screws 11, 13 are arranged so that all the components of the instrument 1 are captive and cannot be separated from one another.

In use, for a diver to measure underwater a parameter such as the vertical depth of a weld or grind from a surface of a structural element, the instrument 1 is placed on the surface substantially at 90° to the length of the weld or grind being measured. The magnets 18, 19 ensure a good grip on the surface. The locking nut 9 is released to enable the probe assembly 3 to move linearly through the carrier 8 to the bottom of the weld or grind. The manually lockable device 9' is slackened off so that the carrier 8 can rotate. The instrument 1 is then adjusted in position, say forwards or backwards with respect to the weld or grind in order to obtain the correct angle of the weld or grind, that is with the tip 12 of the probe 5 at the bottom of the weld or grind. The diver checks visually to ensure that the angle i s correctly measured (the pointer 16 indicating this on the scale 15) The locking device 9' is then tightened manually to lock the carrier 8 at the measured angle.

A line such as a chinagraph line is then drawn on the surface round the rear end and one side of the body 2. This enables the diver to replace the instrument 1 in the correct original position of measurement of the angle described above after the instrument is moved from the surface of the member.

The inner probe assembly part 5, or probe proper is then "zeroed", that is, with the locking device 14 slackened off, the part 5 is moved out of the inner part 4 until the one mark on the scale 10 is aligned with the datum 6 or shoulder on the outer part 4 of the probe assembly 3. This is the position shown in Fig.1. The locking device 14 is then tightened up.

The locking device 9 for the probe assembly is then slackened off and the probe assembly 3 is slid bodily away from the surface, upwardly through the carrier 8. The instrument 1 is then moved away from the weld or grind a sufficient distance so that the probe assembly 3 can move downwardly through the carrier 8 until the nose 12 of the probe 5 comes to rest on the edge of the weld or grind. The locking device 9 is tightened up. The instrument 1 is now set at the correct angle and is "zeroed" in the surface of the element.

The instrument 1 is then moved so that it is in its original position as indicated by the lines on the surface (the edge and back coinciding with these lines). The probe 5 of the probe assembly 3 is then over the centre of the weld or grind the depth parameter of which is to be measured. The locking device 14 is then released, thereby allowing the probe 5 to fall to the bottom of the weld or grind. The diver ensures visually that the probe nose 12 is resting on the deepest point of the weld or grind. The device 14 is then tightened up, the linear movement of the probe being indicated by the reading on the scale 10 adjacent the datum 6.

This distance, and the angle indicated by the pointer 16, are either noted by the diver, or reported by voice link to an observer at the surface of the body of water. These measurements of linear distance and angle then give the vertical penetration, the parameter required, of the grind onto parent metal of the structure by multiplying the linear measurement of the cosine of the angle. Assuming, for example, a linear measurement of 35 mm and an angle of 45° then the vertical penetration is 25 mm.

More particularly:

$$35 \text{ mm} \times 0.707 \text{ (Cos of } 45°) = 25 \text{ mm}$$

The instrument described with reference to the drawings is capable of providing a depth measure of a grind up to 40 mm deep and an angular measurement from 0° to 65°.

To make the instrument 1 more durable, the anodised aluminium components can be replaced with stainless steel, however this increases both the weight and cost.

The body 2 is 130 mm long and 55 mm high. The overall probe length is 168 mm and the weight of the instrument in air is suitably 340 grams (430 grams in stainless steel).

It will be understood that the instrument is versatile and can also be readily used to obtain the following frequently required underwater measurements:

1) Corrosion pitting
2) Indentations
3) Buckled members
4) Height of weld caps
5) Protrusions There could also be an extended probe for when measurements are required in areas of restricted access. Also, when grinding is required to be carried out to a predetermined depth (e.g. 4 mm) then the gauge can be set to 4 mm and used as a ready check in between passes of grinding.

In all underwater uses, a diver is freed from the necessity of making arithmetical calculations underwater, since the instrument can be "zeroed" simply in any situation, allowing direct readings to be taken. Thus, particularly the instrument is a hand-held instrument designed to assist commercial inspection divers in the task of non-destructive testing of the structural members of oil rigs.

Cracks found in the welds of underwater members are ground out using a hydraulic or pneumatic tool. The dive attempts to follow the depth and angle of crack with the grinder, with the result that the depth and angle of the crack can be approximated by measuring the depth and angle of the remedial grind.

The depth and angle of the crack is of great importance to the structural safety engineer in allowing him to make recommendations regarding the structural integrity of the offshore structure. Thus accurate measurement of the grind parameters are of vital importance.

The instrument allows the previously onerous and unreliable task of grind measurements to be undertaken more rapidly and accurately giving reduced inspection costs and increased safety.

It will be understood that the instrument may also be used on dry land.

I claim:

1. An instrument for measuring a parameter of a surface feature of a member, comprising:
   (i) a body adapted to be secured to the surface of a member during measurement;
   (ii) a probe assembly carried on the body by a carrier which permits angular and linear displacement of the probe assembly with respect to the body, the probe assembly including inner and outer telescopically slidable parts the outer of which carries a datum for determining relative movement of the parts and the inner of which carries a graduated scale readable in conjunction with the datum; and
   (iii) means adapted to allow linear movement of the probe assembly relative to the body at a particular angular displacement of the probe assembly relative to the body, said means including a locking device for securing the carrier and the probe assembly at the particular angular displacement.

2. An instrument as defined in claim 1, wherein said means further comprises a second locking device for securing the probe assembly after a desired linear displacement of the probe assembly.

3. An instrument as defined in claim 1, wherein the datum is at an end of the outer part remote from a nose of the probe assembly.

4. An instrument as defined in claim 1, wherein the carrier carries a pointer and the body an angular scale arranged so that the pointer and scale indicate angular displacement of the probe assembly.

5. An instrument as defined in claim 1, wherein the body is adapted to be secured to the surface by a magnetic arrangement of the body which accommodates any configuration of the surface.

* * * * *